United States Patent

Moore

[11] Patent Number: 5,799,713
[45] Date of Patent: Sep. 1, 1998

[54] APPARATUS FOR STORING SEPARATING AND FILLING COFFEE FILTERS

[76] Inventor: Larry W. Moore, 7265 Timberwood Ct., Wilmer, Ala. 36587

[21] Appl. No.: 859,832

[22] Filed: May 16, 1997

[51] Int. Cl.[6] .................................................. B65B 1/04
[52] U.S. Cl. ........................... 141/358; 141/165; 141/173; 222/368; 221/259
[58] Field of Search ...................... 141/358, 267, 141/268, 281, 165, 173, 174, 183, 188, 191; 222/368, 363; 221/259

[56] References Cited

U.S. PATENT DOCUMENTS

| | | | |
|---|---|---|---|
| 4,094,345 | 6/1978 | Deziel | 141/174 |
| 4,121,726 | 10/1978 | Pemberton | 221/37 |
| 4,166,487 | 9/1979 | Spies | 141/358 |
| 5,067,627 | 11/1991 | Anderson | 221/36 |
| 5,097,984 | 3/1992 | Meisner et al. | 221/37 |
| 5,197,630 | 3/1993 | Kirla | 221/37 |

Primary Examiner—J. Casimer Jacyna
Assistant Examiner—Steven O. Douglas
Attorney, Agent, or Firm—Henderson & Sturm

[57] ABSTRACT

An apparatus for storing both coffee and nested stacks of cup-shaped coffee filters, and then automatically filling individual filters with selected amounts of coffee. Through a series of gears, an electric motor rotates an elastic projection against the topmost filter in the stack, dragging it beneath a coffee storage receptacle. Simultaneously, a rotating coffee dispenser fills with a selectable quantity of coffee and then dumps the coffee into the filter. The apparatus also includes a stirring device for insuring the stored coffee falls to the bottom of the coffee receptacle.

5 Claims, 3 Drawing Sheets

5,799,713

APPARATUS FOR STORING SEPARATING AND FILLING COFFEE FILTERS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates to coffee storage canisters and to automatic drip coffee filters, and more particularly to an apparatus which stores coffee and coffee filters and automatically separates and fills individual filters with coffee for brewing.

2. Description of the Related Art

Coffee storage canisters are of course well known. Further, as can be seen by reference to U.S. Pat. Nos. 4,121,726; 5,067,627; 5,097,984; and 5,197,630, the prior art is replete with devices for storing nested stacks of cup-shaped coffee filters and then individually dispensing the filters. However, none of these devices store coffee as well as filters, and then fill individual filters with coffee in preparation for brewing.

BRIEF SUMMARY OF THE INVENTION

The present invention discloses an apparatus for storing both coffee and nested stacks of cup-shaped coffee filters, and then automatically filling individual filters with selected amounts of coffee. Through a series of gears, an electric motor rotates an elastic projection against the topmost filter in the stack, dragging it beneath a coffee storage receptacle. Simultaneously, a rotating coffee dispenser fills with a selectable quantity of coffee and then dumps the coffee into the filter. The invention also includes a stirring device for insuring the stored coffee falls to the bottom of the coffee receptacle.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
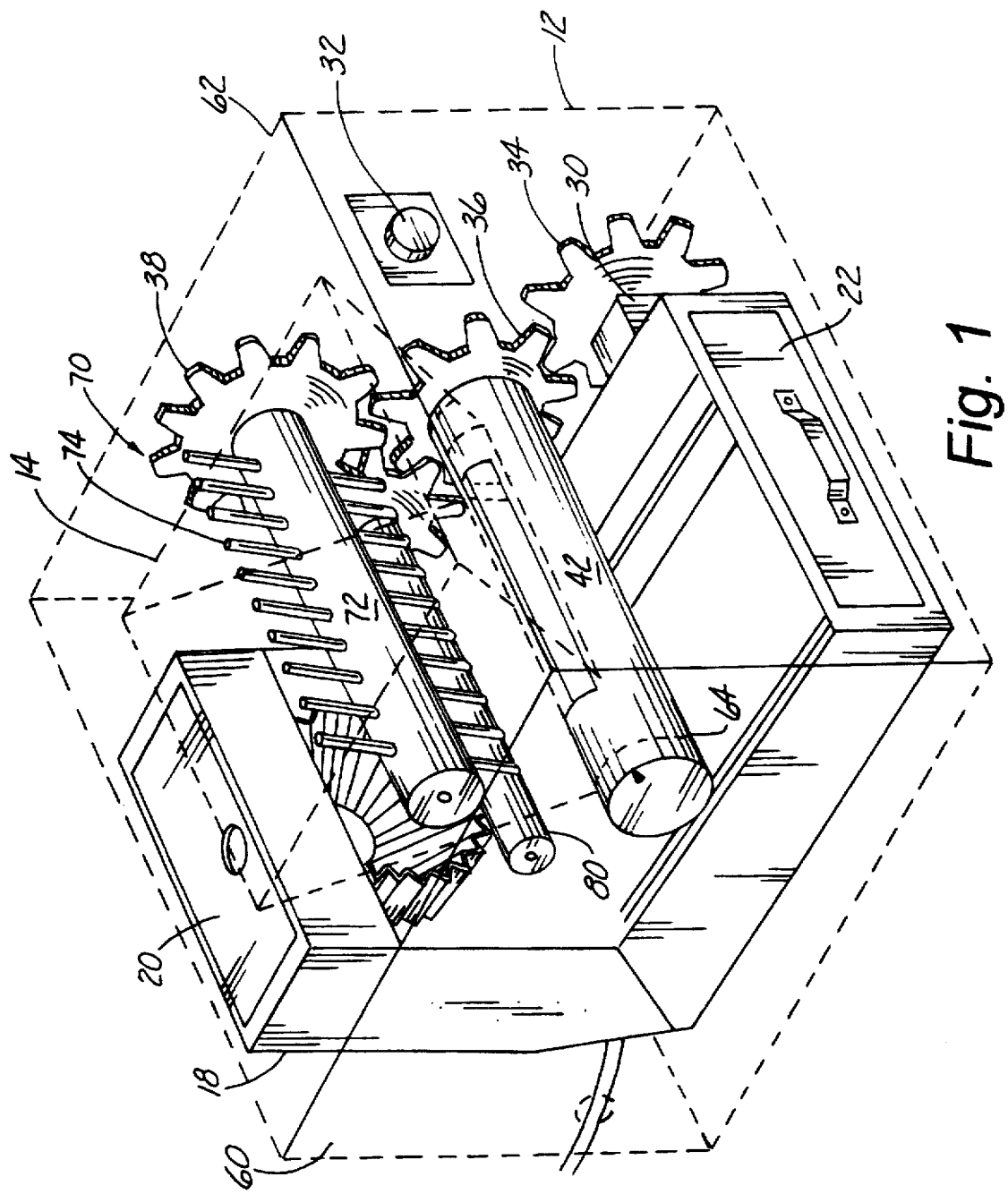
FIG. 1 is a perspective, diagrammatic view of the invention with the external case shown only in outline so as to view the internal components.
Figure 2:
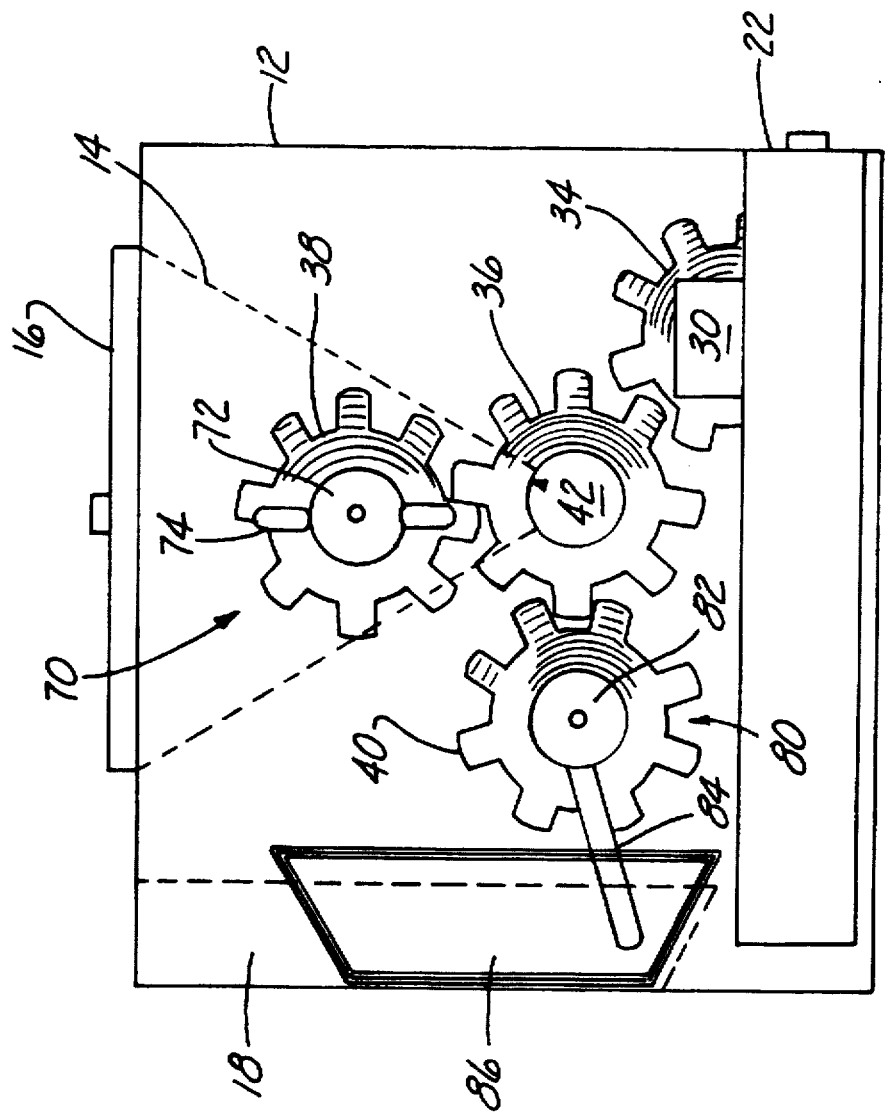
FIG. 2 is a diagrammatic sectional side view of the invention.

Referring now to the drawings, wherein like reference numerals designate identical or corresponding parts throughout the several views, the invention is depicted in FIG. 1 with the housing 12 shown in phantom so that the internal components may be seen. The housing 12 and most other components of the invention are preferably fabricated from molded plastic, although other materials may be appropriate. The invention includes a funnel-shaped coffee storage receptacle 14, accessed through a cover 16, and a filter storage receptacle 18, accessed through a separate cover 20. The coffee storage receptacle 14 is preferably capable of storing at least several pounds of coffee, while the filter storage receptacle 18 should hold a nested stack of at least fifty cup-shaped coffee filters 86. The lower portion of the housing 12 includes a drawer 22 for removal of the coffee filters after they have filled as will be described presently.

The invention is powered by a 12 volt electric motor 30 which turns a first gear 34 through one revolution each time it is actuated by a pushbutton 32. The first gear 34 is in driving contact with a second gear 36, which is in turn in driving contact with a third gear 38 and a fourth gear 40. These four gears 34, 36, 38, 40 are each of identical size so that as the first gear 34 rotates through one revolution, so do each of the three remaining gears 36, 38, 40.

Figure 3:
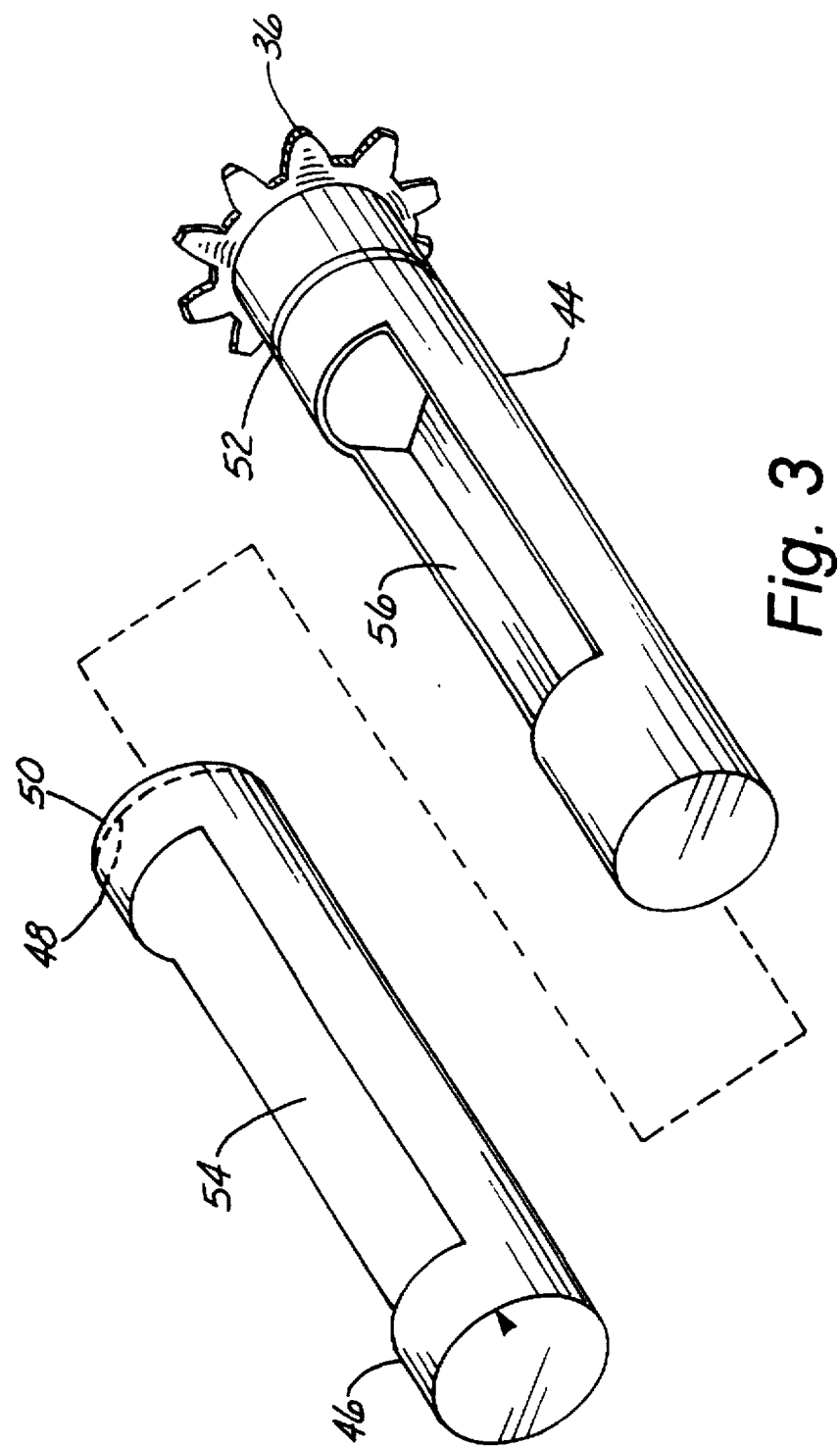
FIG. 3 is an exploded perspective view of the coffee dispenser of the invention.

Second gear 36 is secured to and drives a coffee dispenser 42, also seen in FIG. 3, which comprises a sleeve 46 which slides over and may be manually rotated upon a cylinder 44. The sleeve 46 has a lip 48 within its open end 50 to engage a groove 52 in the cylinder 44 to hold the sleeve 46 on the cylinder 44 while allowing it to rotate about the cylinder 44, albeit with some minimal level of force required to accomplish such rotation. A cutout 54 in the sleeve 46 is adapted to selectively encompass a cavity 56 in the cylinder 44, leaving the cavity 56 open, or to selectively close the cavity 56 by rotation of the sleeve 46 upon the cylinder 44. As seen in FIG. 1, the coffee dispenser 42 extends between the opposing side walls 60, 62 of the housing 12 and abuts against and seals the semicircular bottom of the coffee receptacle 14. The geared end of the coffee dispenser 42 has a small central spindle (not shown) which rotates within a small hole in the side wall 62. The non-geared end of the coffee dispenser 42 extends through and rotates within a hole 64 in the side wall 60. This arrangement allows the sleeve 46 to be grasped and rotated upon the cylinder 44, adjusting the size of the opening in the cavity 56. Thus when the coffee dispenser 42 is rotated within the semicircular bottom of the coffee receptacle 14 by the motor 30 through first and second gears 34, 36, a selectable amount of coffee falls into the cavity 56 and then falls out as the cavity 56 is rotated to face downward.

A coffee stirrer 70, comprising a rod 72 having a series of radial projections 74, is rotatably supported by opposing sides of the coffee receptacle 14 and driven by third gear 38.

A filter dispenser 80, comprising a rod 82 having an elastic projection 84, is rotatably supported by the opposing sidewalls 60, 62 of the housing 12 and driven by fourth gear 40. As the rod 82 rotates, the projection 84, preferably made of rubber, encounters the top filter in the stack of filters 86 and drags it from the stack and down into the drawer 22 where it is then filled with coffee by the coffee dispenser 70.

OPERATION

Operation of the invention begins by selecting the amount of coffee to be dispensed into the filter. This is accomplished by rotating the sleeve 46 of the coffee dispenser to adjust the size of the opening into the cavity 56. The pushbutton 32 is then depressed, causing the motor 30 to drive each of the four gears through one complete revolution. As the coffee dispenser 42 begins to rotate, coffee falls from the coffee receptacle 14 into the cavity 56. Simultaneously, the filter dispenser 80 also rotates and drags a filter 86 from the filter stack and down into the drawer 22 below the coffee dispenser 42. As the coffee dispenser 42 continues to rotate, it dumps its contents of coffee into the filter placed below it. The filter is then removed by withdrawing the drawer 22. During the operation, the coffee stirrer also rotates within the coffee receptacle 14 to ensure the coffee falls to the bottom.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus for storing, separating, and filling automatic drip coffee filters, comprising:

(a) a housing;
   (a) a first receptacle situated within said housing for storing coffee;
   (b) a second receptacle situated within said housing for storing a nested stack of coffee filters;
   (d) filter delivery means for moving a single filter from said nested stack of coffee filters to a position below said first receptacle; and
   (e) coffee delivery means, in communication with said first receptacle, for transferring a portion of coffee from said first receptacle to said filter positioned below said first receptacle.

2. The apparatus of claim 1 and further comprising means for stirring coffee stored within said first receptacle.

3. The apparatus of claim 1 wherein said filter delivery means and said coffee delivery means are powered by an electric motor.

4. The apparatus of claim 1 wherein said coffee delivery means is adjustable as to the quantity of coffee transferred from said first receptacle to said filter.

5. The apparatus of claim 1 and further comprising a drawer for removing said filter from a position below said first receptacle to a position outside of said housing.

* * * * *